(No Model.) 3 Sheets—Sheet 1.
P. BALL.
APPARATUS FOR PURIFYING WATER.
No. 507,774. Patented Oct. 31, 1893.
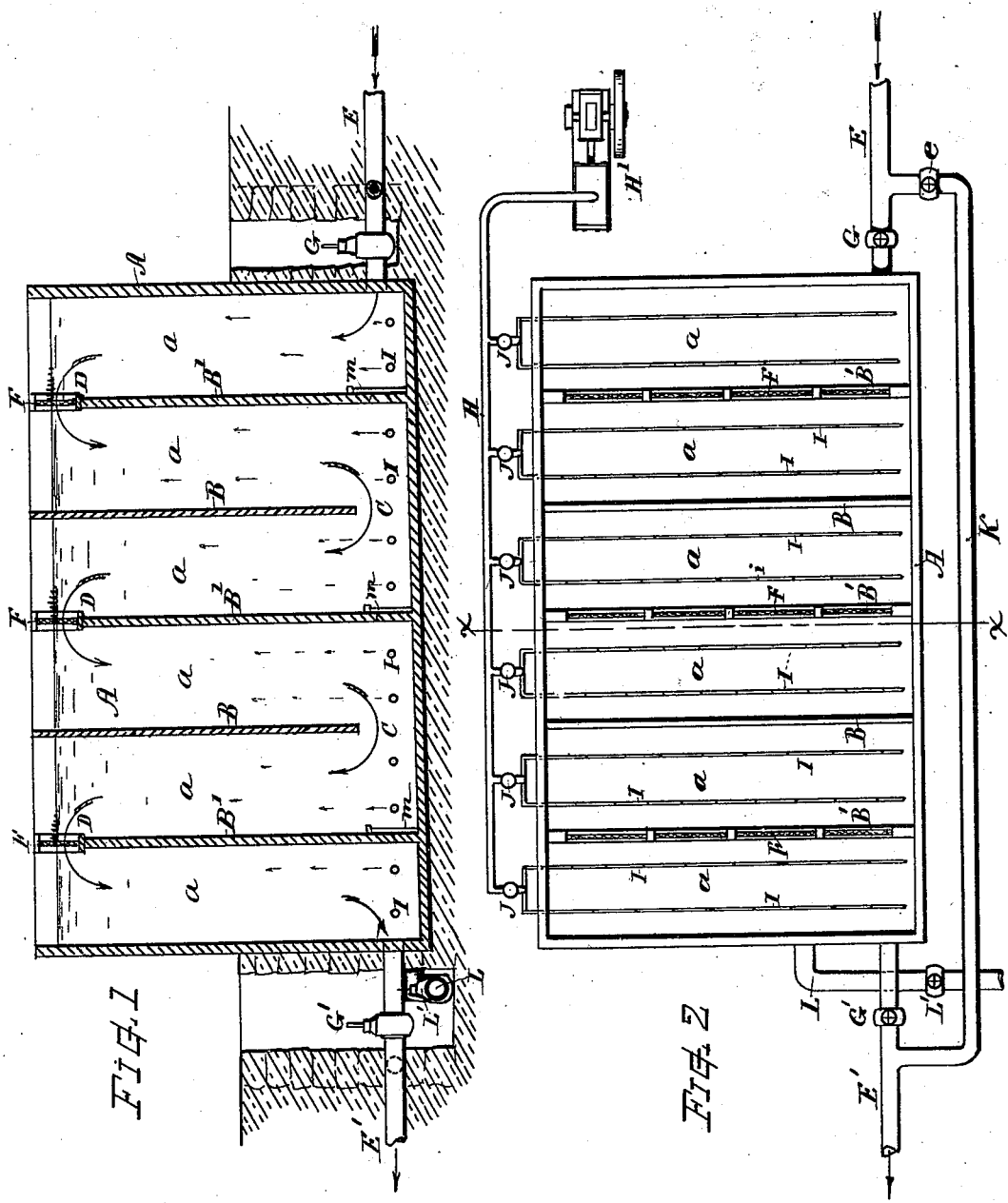

(No Model.) 3 Sheets—Sheet 2.

P. BALL.
APPARATUS FOR PURIFYING WATER.

No. 507,774. Patented Oct. 31, 1893.

Witnesses
Ella P. Blenus
Simeon E. Kula

Inventor
Phinehas Ball
By Chas. H. Burleigh
Attorney

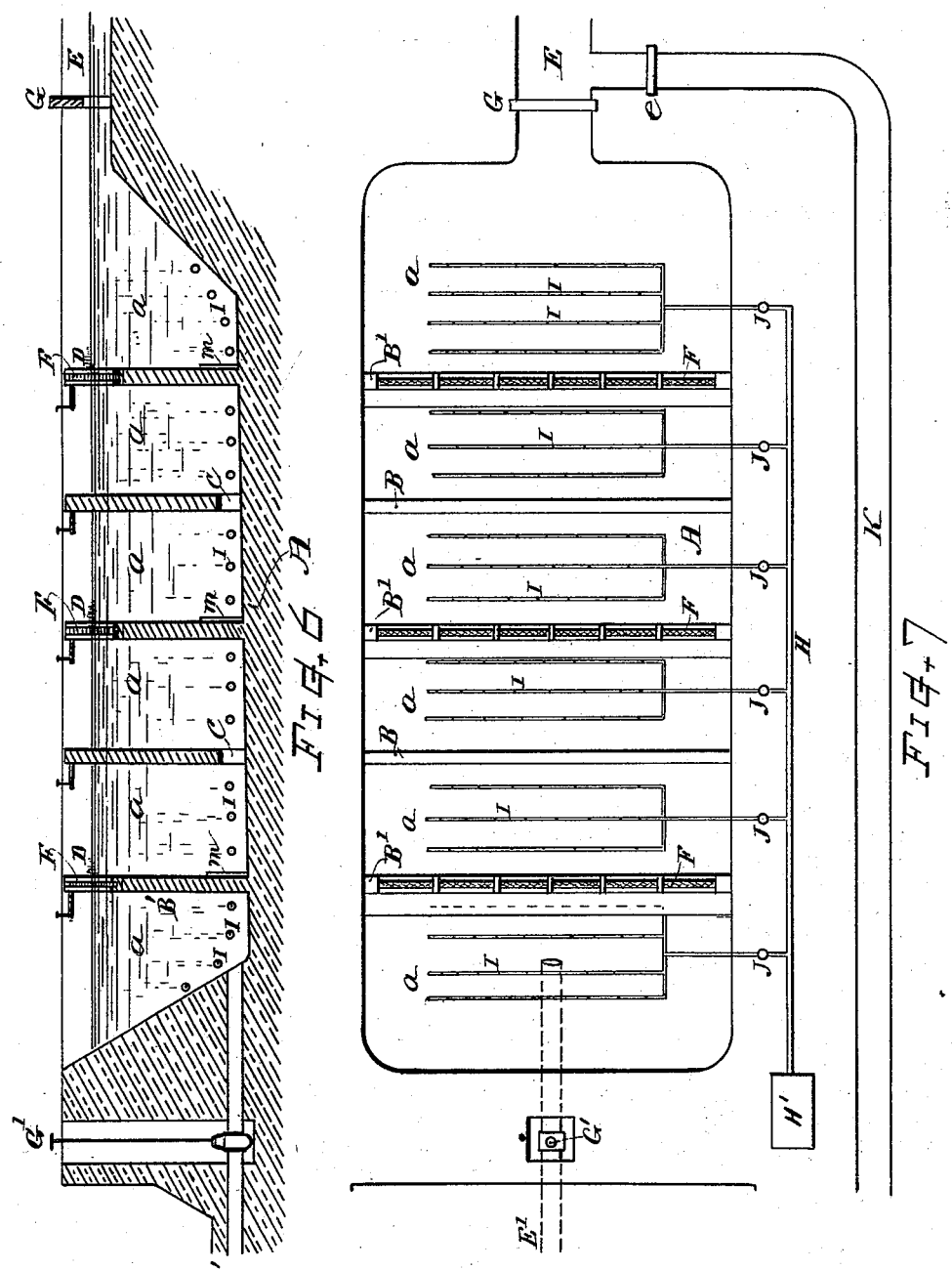

UNITED STATES PATENT OFFICE.

PHINEHAS BALL, OF WORCESTER, MASSACHUSETTS.

APPARATUS FOR PURIFYING WATER.

SPECIFICATION forming part of Letters Patent No. 507,774, dated October 31, 1893.

Application filed December 31, 1892. Serial No. 456,919. (No model.)

*To all whom it may concern:*

Be it known that I, PHINEHAS BALL, a citizen of the United States, residing at Worcester, in the county of Worcester and State of Massachusetts, have invented a new and useful Air Apparatus for Improving Potable Water, of which the following, together with the accompanying drawings, is a specification sufficiently full, clear, and exact to enable persons skilled in the art to which this invention appertains to make and use the same.

The object of the within described invention is the purification and qualitative improvement of potable water in reservoirs, conduits or other sources of supply; and to afford efficient means for the aggregation and removal therefrom of contaminating matters in a practical, convenient and inexpensive manner. These objects I attain by the method and means illustrated, and as explained in the following description; the particular subject-matter claimed being hereinafter definitely specified.

Figure 3:
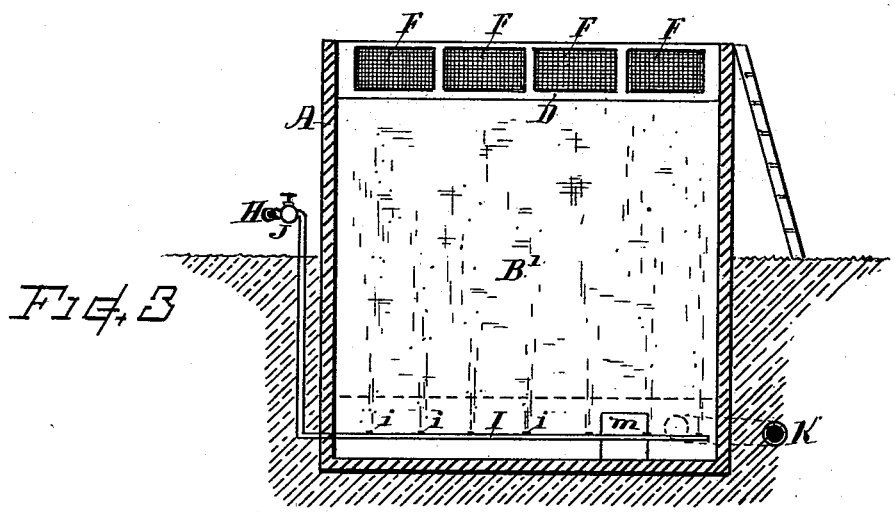
Figure 4:
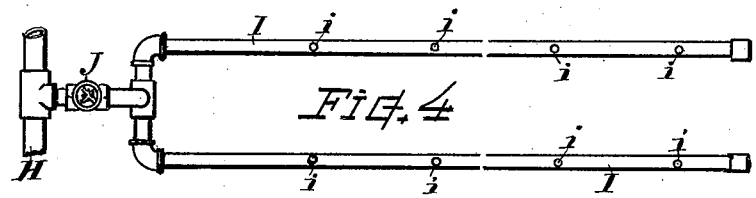
Figure 5:
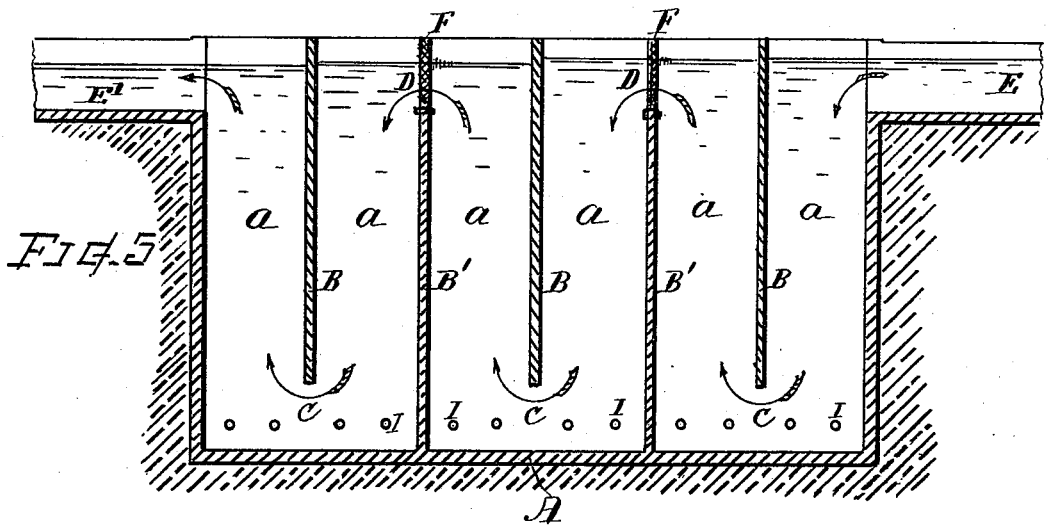

In the drawings, Figure 1 is a vertical longitudinal section, and Fig. 2 a plan view of an apparatus illustrating the nature of my invention as applied to a water-supply main. Fig. 3 is a transverse section of the same at line $xx$. Fig. 4 is a detail view of one of the air-pipe sections. Fig. 5 illustrates the adaptation of the invention to a conduit, and Fig. 6 shows a section, and Fig. 7 a plan view illustrating the adaptation of the invention in an open reservoir.

In accordance with my invention the water is caused to flow through an open reservoir, containing-basin, or series of basins, the area of which is separated at intervals into adjacent compartments by partitions or barriers that are respectively provided alternately with submerged pass-ways and surface pass-ways; the latter being furnished with screens or strainers for the retention of scum or floating particles of matter; while at the bottom of the basin or reservoir in the several compartments there is arranged a system of pipes connected with an air forcing apparatus and having numerous orifices through which air is forced into the water and there freed to naturally expand and ascend to the surface in small bubbles for buoying up and aggregating the impurities as floating particles or scum that become collected upon the surface screens by the passing of the water to the adjacent compartment; from which screens it can be removed as occasion may require.

In the drawings the parts marked A represent the main containing basin, which may be either the storage reservoir, or an open tank or basin arranged at any convenient location in connection with a supply channel, water-main or conduit, as may best meet the conditions and circumstances pertaining to any particular instance or situation where employed. The area of said main basin is separated into a number of minor divisions or adjacent compartments $a$ by upright barriers or partitions B B'.

E indicates the supply or inlet passage leading into the first compartment of the main basin or reservoir, and E' indicates the delivery or outlet passage leading out from the last compartment of said basin. The inlet and outlet are provided with stop-gates or valves G and G' at the positions indicated. The partitions B are provided with submerged pass-ways C for the flow of water from one compartment to that next adjoining; and the alternating partitions B' are made with an over-fall or pass-ways D at the surface level for the flow of the water to the adjacent compartment.

Removable screens or strainers F are arranged in the pass-ways D, or along the top of the barriers or partitions B', through which screens the water passes with a slow movement on its way from one compartment to the next. The screens are best made in sections that can be conveniently handled and interchangeable so that they can be readily removed and replaced when desired. The screens F are preferably not less than sixty times the area of the inlet pipe, and may be made of fine wire netting, felt, cloth fabric, comminuted coke or other suitable material, or two netting screens filled between with any well known strainer material may be employed.

I I indicate air-pipes laid along the bottom of the several compartments and having at intervals small perforations or nozzles $i$ for the escape of air therefrom. Said pipes are joined with a main supply pipe H that connects with a suitable air compressor or air-forcing apparatus H' by which a continued blast of air can be supplied to the pipes I and ejected through the openings $i$ into the contents of the respective compartments. Valves J are provided for controlling the flow of air from the supply pipe H to the respective branch pipes or aerating sections I, so that the action in one or more of the compartments $a$ can at any time be stopped without interfering with the action in other portions of the plant.

A by-pass, water-way K is arranged in connection with the water-supply E and the delivery E', which by-pass is furnished with a stop-gate $e$ for controlling its passage. An escape-way L having a stop-gate L' is arranged for drawing off the basin when required. Close gates $m$ are preferably provided at the lower part of the partitions B' to facilitate draining and cleaning out the several compartments when required.

The partitions B B' may be of wood, iron, brick or other suitable material according to the size, location or condition and extent of structure in any particular instance. The depth of the basin A may be varied in different instances, but preferably should be sufficient to give at least fifteen feet depth of water above the pipes I.

For large basins footways or bridges would be provided along the tops of the partitions for convenient access to the removable screens.

In the operation, the water enters the first compartment of the basin wherein it gradually rises and flows over the top of the first partition B', passing through the strainers or screens thereon supported, and into the second compartment wherein its current is downward and passing through the pass-way D into the third compartment where it again rises and flows through the strainers at the top of the third partition to again descend in the next adjacent compartment, and so on alternately rising and descending throughout the entire series of compartments, which may be composed of any desired or convenient number. In each of the several compartments the water is subjected to the action of the air introduced and distributed through the pipes I which is set free at the orifices $i$ and allowed to naturally rise in bubbles through the mass of water to the open surface thereof; thereby aggregating and bringing to the surface as floating scum the contaminating matter contained in the water as originally received at the inlet, which scum is confined between the partitions to be removed by skimming the surface, or collected upon the screens or strainers to be removed by taking out, cleaning and replacing the screens.

I am aware that the introduction of air into water for purposes of purification or aeration has been heretofore practiced under different conditions and in various ways; it will therefore be understood that I do not herein claim such feature broadly as of my invention.

What I claim, and desire to secure by Letters Patent, is—

1. The reservoir, basin or tank divided into separate compartments by the series of partitions having alternately submerged passways and surface pass-ways, and provided with a system of air-injecting pipes at or near the bottom of the several compartments through which air is forced and freed for normally rising to the surface, and a series of screens or guards at said surface passways that intercept floating substances or scum and prevent the passage thereof from one compartment to another, substantially as and for the purpose set forth.

2. The reservoir, basin or tank having at its respective ends the inlet and outlet waterways, and divided into a series of separate compartments by partitions that have alternately surface-pass-ways and submerged pass-ways between adjacent compartments, said surface pass-ways provided with removable screens or strainers, in combination with a series of perforated air-pipes laid at or near the bottom of the basin within the respective compartments and severally connected to the delivery pipe from an air-forcing apparatus, and valves for controlling the delivery of air into said compartment, substantially as and for the purposes set forth.

Witness my hand this 29th day of December, A. D. 1892.

PHINEHAS BALL.

Witnesses:
CHAS. H. BURLEIGH,
ELLA P. BLENUS.